United States Patent [19]

Zabler

[11] 4,080,592
[45] Mar. 21, 1978

[54] TRANSDUCER FOR VEHICULAR SERVICE COMPENSATED FOR ACCELERATOR MOVEMENTS OF THE VEHICLE

[75] Inventor: Erich Zabler, Karlsruhe, Germany

[73] Assignee: Robert Bosch GmbH, Stuttgart, Germany

[21] Appl. No.: 671,995

[22] Filed: Mar. 30, 1976

[30] Foreign Application Priority Data

Apr. 8, 1975 Germany .............................. 2515258

[51] Int. Cl.² ............................................. G08C 19/08
[52] U.S. Cl. ...................................... 340/199; 336/75; 336/79; 340/196
[58] Field of Search ................ 324/208; 340/199, 196, 340/195, 262; 336/75, 79; 323/51; 324/34 D

[56] References Cited

U.S. PATENT DOCUMENTS

| | | | |
|---|---|---|---|
| 2,697,214 | 12/1954 | Smith ................... | 340/199 |
| 2,922,146 | 1/1960 | Smith et al. ............ | 340/199 |
| 3,070,742 | 12/1962 | Smith et al. ............ | 340/199 |
| 3,820,094 | 6/1974 | Mouri et al. ............ | 340/199 |
| 3,890,607 | 6/1975 | Pelenc et al. .......... | 340/199 |
| 3,973,191 | 8/1976 | Zabler ................... | 324/34 D |
| 4,013,986 | 3/1977 | Weckenmann ......... | 336/79 |

*Primary Examiner*—John W. Caldwell, Sr.
*Assistant Examiner*—James J. Groody
*Attorney, Agent, or Firm*—Flynn & Frishauf

[57] ABSTRACT

An inductive transducer is provided with a core with legs extending in opposite directions from a yoke on which a coil is wound. On the leg portions extending on one side of the coil a short-circuiting ring displaceable in accordance with the displacement of a body the movement of which is to be measured is provided and on the leg portions extending on the other side of the coil a compensating short-circuiting ring is provided having a mass corresponding to the total mass of the first short-circuiting ring and the movable portion of the body to which it is connected and the connection therebetween. The effect of acceleration forces produces an equal shift of both short-circuiting rings in the same direction, leaving the total flux linking the coil substantially unchanged. The device can be adapted to measure either linear or angular movement.

7 Claims, 5 Drawing Figures

U.S. Patent   March 21, 1978   4,080,592
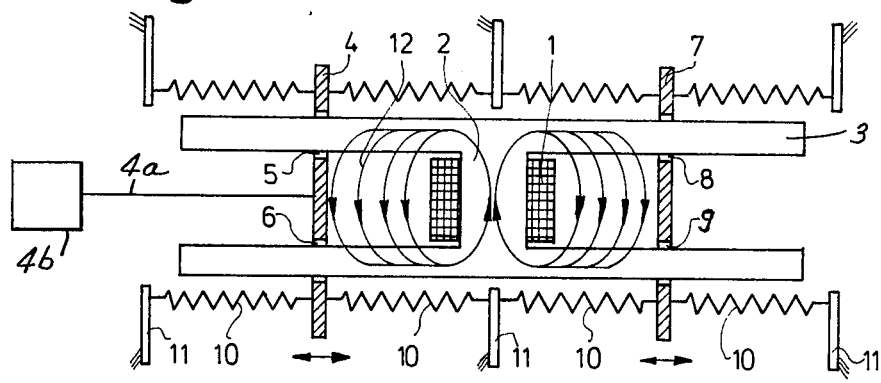
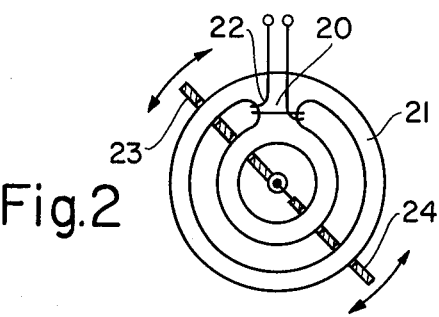
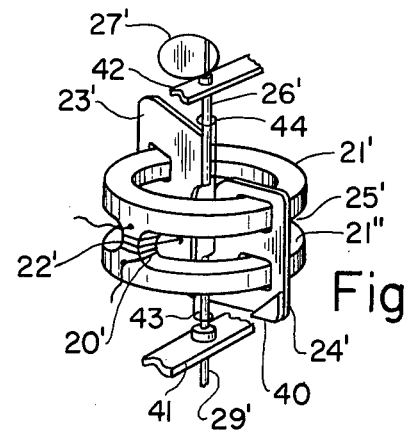
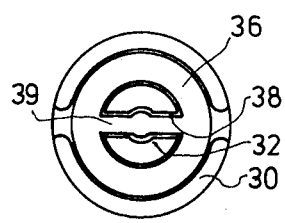
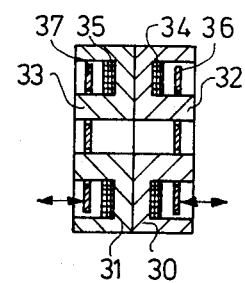

TRANSDUCER FOR VEHICULAR SERVICE COMPENSATED FOR ACCELERATOR MOVEMENTS OF THE VEHICLE

CROSS REFERENCES TO RELATED APPLICATIONS

|  |  | Filing Date | Inventor |
|---|---|---|---|
| Pat. No. | 4,013,986 | 7/23/74 | Albert Weckenmann |
| Ser. No. | 671,993 | 3-30-76 | Erich Zabler |

This invention relates to an inductive transducer for converting a mechanical movement into an analog or digital electrical magnitude, particularly an electrical potential, that depends in a predetermined way on the displacement of the object the movement of which is to be measured, in particular an electric potential that is a linear function of such displacement. In particular the invention relates to transducers having a magnetic winding provided on a ferromagnetic core having two or more legs extending away from the place where the magnetic winding is located and a shortcircuiting ring encircling some or all of the legs and mechanically connected to the body the movement of which is to be measured, the inductance being caused to vary with the movement of the short-circuiting ring.

The solenoid transducer is an inductive transducer that has been known for a long time. In that device a freely movable ferromagnetic core is made movable in and out of a coil, as the result of which the inductance L of the coil is variable. Since the relation between the displacement of the core and the inductance is not linear in this case, linearizing the transducer can be accomplished only by electronic circuits of relatively great expense. The sensitivity of such a device is small. Furthermore, the solenoid transducer has a great physical length compared to the usable working displacement range. A further disadvantage is the relatively great mass of the ferromagnetic core and the occurrence of indication errors as the result of acceleration forces operating in the direction of measurement.

It is an object of the present invention to provide an inductive transducer of which the movable part has as small a mass as possible, and especially one which is well-suited for dynamic measurements in which measuring errors are prevented from being caused by acceleration forces. Furthermore, the transducer should be built as simply and cheaply as possible and thus be suitable for large-scale production.

SUMMARY OF THE INVENTION

The magnetic winding is provided on a core in such a way that the magnetic flux extends in two opposite directions away from the location of the magnetic winding into legs of the core extending on both sides of that location. The shortcircuiting ring mechanically connected to the object to be measured is made to be movable along legs of the core on one side of the magnet winding and a compensating short-circuiting ring is arranged to be movable along the legs of the core on the other side of the magnet winding, these two rings limiting the extension of magnetic flux within the core on the respective two sides of the magnet winding. The two short-circuiting rings each move subject to the opposition of a restoring force and they both respond in the same direction to acceleration forces, so that the total magnetic flux through the core is not changed by movements resulting from acceleration forces.

According to an advantageous form of the invention, the restoring force on the short-circuiting ring and on the compensation short-circuiting ring is produced by springs having a flat restoring force characteristic and, moreover, the mass of the compensating short-circuiting ring is made substantially equal to the sum of the masses of the movable parts of the object whose displacement is to be measured and of the short-circuiting ring connected thereto, including also of course the mass of any connecting member between them. One particularly useful physical embodiment of the invention utilizes an H-shaped core with the magnet winding on the yoke of the H. In this case the short-circuiting ring connected to the object whose movement is to be measured is arranged to move along both legs of the core on one side of the yoke and the compensating short-circuiting ring is arranged to move along both legs of the core on the other side of the yoke.

In another useful physical embodiment of the invention, the core has two concentric or coaxial circular legs joined by a yoke, the magnetic winding is on the yoke, the short-circuiting ring connected to the object whose movement is to be measured is movable along the legs of the core on one side of the yoke and the compensating short-circuiting ring is movable along the legs of the core on the other side of the yoke.

In still another useful physical embodiment of the invention, the core is formed of two shell-type cores in contact with each other on their yoke surfaces, the short-circuiting ring connected to the object whose movement is to be measured being made movable along the inner core of one of the shell-type cores and the compensating short-circuiting ring being made movable along the inner core of the other of the shell-type cores. In this case a magnet winding is provided at the inside bottom of each of the shell-type cores.

The three physical embodiments of the invention just mentioned are further described by way of example in the drawings, in which:

FIG. 1 is a side view, partly in section and partly diagrammatic, of a first embodiment of the invention, using an H-shaped core;

FIG. 2 is a diagrammatic view, with the short-circuiting rings shown in section, of a second embodiment of the invention utilizing a circularly shaped core;

FIG. 2a is a diagrammatic perspective variation of the embodiment of FIG. 2;

FIG. 3 is an end view and FIG. 4 is a sectional view passing through the axis, of an embodiment of the invention using a core made up of back-to-back shell-type cores.

In the embodiment shown in FIG. 1, a magnet winding 1 is provided on the yoke 2 of an H-shaped core 3 that is made of ferromagnetic material. On the legs of the core extending to one side of the yoke a short-circuiting ring 4 with openings 5 and 6 is movably mounted, the short-circuiting ring being in the form of a conducting plate with openings through which the legs of the core pass. On the other side of the yoke a compensating short-circuiting ring 7, with openings 8 and 9 for the legs on that side of the core, is similarly mounted. The short-circuiting ring 4 and the compensating short-circuiting ring 7 are movable in directions parallel to the long dimension of the core legs. The short-circuiting ring 4 is arranged, by means symbolized by the line 4a, to be moved by the displacement of an object 4b whose movement is to be measured. The movement of the short-circuiting ring 4 and that of the compensating short-circuiting ring 7 takes place against a restoring force that is produced by springs 10 that have a flat extension and compression characteristic with respect to restoring force. The springs 10 are anchored at one end on mounting hooks or brackets 11 fixed to the frame or casing (not shown) of the device and at the other end are connected to the short-circuiting ring 4 or to the compensating short-circuiting ring 7, as the case may be.

The manner of operation of the inductive transducer shown in FIG. 1 involves the production by the magnetic winding 1 of a homogeneous alternating magnetic field, shown by lines of force 12, between the legs of the core 3. The short-circuiting ring 4 and the compensating short-circuiting ring 7 respectively provide a short-circuiting winding for the legs they respectively encircle, so that no alternating magnetic field can extend beyond the ring 4 or the ring 7 as the case may be. To a good degree of approximation, the aggregate magnetic flux is limited proportionally to displacement of the particular short-circuiting ring on each side of the magnet winding 1. According to the law of induction the inductance of the magnet winding 1 is similarly modified in a manner proportional to such displacement. Accordingly, the movement of the object 4b will shift the short-circuiting ring 4 in one of the directions indicated by the double arrow and thus change the inductance of the magnet winding 1. If the transducer is exposed to acceleration forces operating in the direction of the measured movement, then, provided that the mass of the compensating short-circuiting ring 7 is equal to the sum of the masses of the short-circuiting ring 4 and the movable parts of the object 4b and the connection 4a, there is produced a parallel displacement of the short-circuiting ring 4 and of the compensating short-circuiting ring 7 in the direction of acceleration. When that happens, however, no change in the total magnetic flux linking the magnet winding is produced, since that total flux is composed of a right-hand portion and a left-hand portion and is therefore independent of acceleration movement of the short-circuiting ring 4.

It goes practically without saying that the mounting of the magnetic coil 7 as well as the placing in position of the short-circuiting rings 4 and 7 can be simplified if the core 3 is not one integral body but is made up by fitting appropriately shaped parts together.

Preferably the short-circuiting ring 4 and the compensating short-circuiting ring 7 have masses as small as possible. An inductive transducer according to this invention can be used, for example, for air quantity measurements in the intake duct of an internal combustion engine. A deflection disk or flap can be connected with the short-circuiting ring 4 or the short-circuiting ring can itself be the flap or disk responsive to intake vacuum or to vacuum-induced air flow. The displacement of such a disk by the air stream against a restoring force is then a measure for the amount of air passing through the intake in a unit of time. A further advantage of the inductive transducer for this purpose is that the output signal can be made digital or analog at the choice of the instrument designer for supply to the appropriate evaluation circuit. The electronic evaluation circuit can be simply made up of operational amplifiers, so that the entire circuit can be made in the form of an integrated circuit unit.

FIG. 2 shows a second embodiment of an inductive transducer according to the invention in which the magnet coil 22 is wound on the yoke joining two concentric circular legs of the core 21. Of course instead of being in the plane of concentric legs of different diameter, the yoke could also be made in a form joining coaxial circular legs of the same diameter, as shown in FIG. 2a.

A short-circuiting ring 23 is mounted for movement along the circularly bent legs on one side of the magnet coil 22 of FIG. 2 and a compensating short-circuiting ring 24 is similarly and independently mounted for movement along the circularly bent legs on the other side of the magnet coil 22. The displacement of the short-circuiting ring 23 and that of the compensating short-circuiting ring 24, as in the case of the embodiment of FIG. 1, takes place against the force of restoring springs, not in this case shown in the drawing, that have flat restoring force characteristic. The transducer of FIG. 2 is preferably utilized as an angle of rotation transducer. It manner of operation is, however, analogous to that of the inductive transducer shown in FIG. 1, because the acceleration forces which could disturb the measurement are in this case rotary (angular) and are compensated by the simultaneous effect on the compensating short-circuiting ring 24. Again, the core can advantageously be a composite one made up of parts put together, in order to facilitate assembly of the device.

In FIG. 2a, the yoke portion 20' of the core, upon which the winding 22' is wound, is parallel to the common axis of the circular portions 21' and 21", which in this case are of the same diameter and are spaced axially by an air gap 25'. The short-circuiting plate 23' is mounted on a shaft 26' centered on the axis of the circular portions of the core, which is connected with a rotatable body 27', which may be a swinging vane in an intake manifold (not shown) of an internal combustion engine (not shown). The compensating short-circuiting plate 25' is similarly mounted upon another shaft 29' which, like the shaft 26', is centered on the axis of the circular portions of the core. A weight 40 is added on the compensating short-circuiting plate 24' so that the moment of inertia of the short-circuiting plate 24' will be equal to that of the short-circuiting plate 23' plus of the other masses moving angularly therewith about the axis of the core.

The shafts are shown mounted in bearings on fixed members 41 and 42 that are part of a framework in fixed relation to the core 20', 21'. Collars 43 and 44 allow the shafts 26' and 29' to brace each other while still being able to rotate independently. As in the case of FIG. 2, restoring springs (not shown) having a flat restoring force characteristic are utilized to modify the movement of both short-circuiting plates 23' and 24', in a manner analogous to that diagrammatically shown in FIG. 1 for the short-circuiting plates 4 and 7.

FIGS. 3 and 4 show the use of shell-type cores to provide a core for an inductive transducer according to the invention. In this case commercially available shell-type cores, such as those provided by the Siemens Company under the type designation T26, can be used. As a result of the substantially larger pole surfaces, larger inductance variation ratios are obtainable with these than with other shapes of cores. In accordance with the invention, the outer yoke surfaces of two shell-type cores 30 and 31 placed back-to-back are brought into close contact. Commercially available ferrite shell cores have outer and inner portions representing concentric magnetic circles. The inner core portions 32 and 33 are encircled at the bottom of each shell core by a magnet winding 34, 35. The magnetic field of the inner core normally is completed over the outer core or casing. A short-circuiting ring 36 in the form of an apertured disk encircling the inner core 32 and likewise a compensating short-circuiting ring 37 of the same shape encircling the inner core 33 prevent an axial penetration of the magnetic flux along the inner core beyond the short-circuiting ring and force the flux to go radially across the space filled with air or other non-ferromagnetic medium between the inner core and the outer casing to complete its path through the latter. The field in the open space between the inner core and the outer shell is to a high degree homogeneous with respect to the axial direction, so that the inductance of the magnet coils 34 and 35 can be very linearly modified by shifting of the short-circuiting ring 36 or 37 as the case may be. The displacement of the short-circuiting rings 36 and 37 takes place, as described in connection with FIG. 1, against the restoring force of springs not shown in this particular case. As already described in connection with FIG. 1, when there is a displacement of the short-circuiting ring 36 as the result of an acceleration force, there is also a parallel displacement of the compensating short-circuiting ring 37, so that no change results in the aggregate magnetic flux linking the coil. If the inner core 32, 33 is provided with a transverse slot 38, the short-circuiting ring 36 and likewise the compensating short-circuiting ring 37 can be axially fastened and guided by a cross piece 39 running through the slot 38. If the inner core 32 is slotted for the purpose just mentioned, the outer shell of the core can likewise be slotted as shown in FIG. 3.

Although the invention has been described with reference to particular illustrative embodiments, it will be understood that further variations are possible within the inventive concept.

In particular, features mentioned above in connection with one embodiment may be applied to or adapted to another form of embodiment.

I claim:

1. An inductive transducer for converting into an electrical signal a mechanical displacement transmitted through a member (4a) responsive to the relative displacement of a body (4b) relative to the transducer while the transducer is subjected to acceleration forces tending to distort its conversion characteristic, said electrical signal depending in a predetermined manner upon said displacement, said transducer comprising a magnet winding on a core of ferromagnetic material having a plurality of legs extending away from the portion thereof on which said magnet winding is provided and a short-circuiting ring encircling at least one of said legs and linked to said member so that the inductance of said winding will vary with said displacement and comprising the improvement wherein:

said magnet winding (1, 22, 34, 35) is so disposed on said core (3, 21, 30, 31) that the magnetic flux can extend in said core legs in two opposite directions on opposite sides of said magnet winding and is limited on one side of said magnet winding by the position of said short-circuiting ring (4, 23, 36) linked to said member (4a) and on the other side of said magnet winding by the position of a compensating short-circuiting ring (7, 24, 37), wherein also the displacement of said first-mentioned short-circuiting ring (4, 23, 36) and of said compensating short-circuiting ring (7, 24, 37) takes place in each case in opposition to a restoring force (10), and wherein the mass of said compensating ring is at least equal to that of said first-mentioned short-circuiting ring in order to balance out from the response of said transducer to said displacement the effect of said acceleration forces on at least said first-mentioned short-circuiting ring.

2. An inductive transducer in accordance with claim 1, in which said restoring force (10) acting on the first-mentioned short-circuiting ring (4, 23, 36) and on the compensating short-circuiting ring (7, 24, 37) is produced by springs (10) with a flat characteristic relating restoring force to displacement.

3. An inductive transducer as defined in claim 2, in which said short-circuiting ring (4, 23, 36) is connected by said member (4a) to a body (4b) the displacement of which is to be measured and in which the mass of said compensating short-circuiting ring (7, 24, 37) is substantially equal to the sum of the masses of said body, said short-circuiting ring (4, 23, 36) and the connection therebetween including said member.

4. An inductive transducer as defined in claim 3, in which said first-mentioned short-circuiting (4, 23, 36) and said compensating short-circuiting ring (7, 24, 37) are so positioned and mounted relative to said core (3, 21, 30, 31) that under the influence of acceleration forces they are displaced in the same direction, whereby the effect of acceleration leaves the aggregate magnetic flux through the core (3, 21, 30, 31) unchanged.

5. An inductive transducer as defined in claim 4, in which said magnetic winding (1) is located on the yoke (2) of an H-shaped core (3) and said first-mentioned short-circuiting ring (4) is movable along the two legs of said core on one side of said yoke (2) and the compensating short-circuiting ring (7) is movable along the two legs of said core on the other side of said yoke (2).

6. An inductive transducer as defined in claim 4, in which said magnetic winding (22) is provided on a yoke joining two concentric or coaxial circularly shaped legs of said core extending on both sides of said yoke (20) and in which said first-mentioned short-circuiting ring (23) is movable along both of said legs on one side of said yoke (20) and the compensating short-circuiting ring (24) is movable along both of said legs on the other side of said yoke (20).

7. An inductive transducer as defined in claim 4, in which said core is formed of two shell-type cores (30, 31) in back-to-back contact at their yoke surfaces, in which a magnet winding (34, 35) is provided at the inside bottom of each of said shell-type cores, and in which said first-mentioned short-circuiting ring (36) is movable along the inner core (32) of one of said shell-type cores (30) and said compensating short-circuiting ring (37) is movable along the inner core (33) of the other of said shell-type cores (31).

* * * * *